US011323175B1

(12) United States Patent
Edirisinghe et al.

(10) Patent No.: US 11,323,175 B1
(45) Date of Patent: May 3, 2022

(54) FAST SYSTEM OPTIMIZATION (FSO) WITH OPTIMALLY PLACED RECOVERY TONES

(71) Applicant: Infinera Corp., Annapolis Junction, MD (US)

(72) Inventors: Sumudu Geethika Edirisinghe, Newmarket (GB); Pierre Mertz, Baltimore, MD (US); Steven William Beacall, Bridgwater (GB)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/125,766

(22) Filed: Dec. 17, 2020

Related U.S. Application Data

(60) Provisional application No. 63/106,420, filed on Oct. 28, 2020.

(51) Int. Cl.
*H04J 14/02* (2006.01)
*H04B 10/032* (2013.01)
*H04B 10/50* (2013.01)
*H04B 10/296* (2013.01)
*H04Q 11/00* (2006.01)

(52) U.S. Cl.
CPC ........... *H04B 10/032* (2013.01); *H04B 10/50* (2013.01); *H04J 14/0212* (2013.01); *H04B 10/296* (2013.01); *H04J 14/02* (2013.01); *H04J 14/0213* (2013.01); *H04J 14/0221* (2013.01); *H04Q 2011/0016* (2013.01)

(58) Field of Classification Search
CPC .... H04B 10/032; H04B 10/50; H04B 10/296; H04J 14/0212; H04J 14/02; H04J 14/0213; H04J 14/0221; H04Q 2011/0016

USPC ................................................... 398/43–103
See application file for complete search history.

(56) References Cited

U.S. PATENT DOCUMENTS

| | | | | |
|---|---|---|---|---|
| 6,859,623 | B2 * | 2/2005 | Le Bouette | H04B 10/296 398/164 |
| 9,831,978 | B1 * | 11/2017 | Mehrvar | H04B 10/27 |
| 10,735,837 | B1 * | 8/2020 | Al Sayeed | H04J 14/0257 |
| 10,833,791 | B1 * | 11/2020 | Al Sayeed | G02B 6/29383 |
| 2003/0113117 | A1 * | 6/2003 | Taneda | H04B 10/506 398/79 |
| 2005/0024715 | A1 * | 2/2005 | Inoue | H04J 14/0221 359/337 |
| 2008/0304829 | A1 * | 12/2008 | Sato | H04J 14/0221 398/79 |
| 2008/0310858 | A1 * | 12/2008 | Lu | H04B 10/296 398/158 |
| 2011/0222851 | A1 * | 9/2011 | Berg | H04J 14/0213 398/48 |
| 2011/0311216 | A1 * | 12/2011 | Inoue | H04J 14/0213 398/1 |
| 2012/0087658 | A1 * | 4/2012 | Jander | H04Q 11/0005 398/48 |
| 2013/0016964 | A1 * | 1/2013 | Mu | H04B 10/80 398/1 |

(Continued)

*Primary Examiner* — Dibson J Sanchez
(74) *Attorney, Agent, or Firm* — Dunlap Codding & Rogers PC; David Soltz

(57) ABSTRACT

Described herein is an apparatus including a continuous wave idler and an optical coupler that provide an optical signal having a power greater than optical channels carrying data, and positioned at a cross-over point between two spectral bands, with each band encompassing multiple optical channels.

5 Claims, 8 Drawing Sheets

(56) References Cited

U.S. PATENT DOCUMENTS

| | | | |
|---|---|---|---|
| 2013/0209097 A1* | 8/2013 | Vo ........................ | G02B 6/4215 |
| | | | 398/38 |
| 2018/0062782 A1* | 3/2018 | Mehrvar ............. | H04J 14/0221 |
| 2018/0069648 A1* | 3/2018 | Inada ................... | H04B 10/073 |
| 2018/0269964 A1* | 9/2018 | Mertz ...................... | G02B 6/43 |
| 2020/0244386 A1* | 7/2020 | Yamamoto ........... | H04B 10/077 |
| 2020/0336238 A1* | 10/2020 | St-Laurent .............. | G02F 1/313 |

* cited by examiner

FAST SYSTEM OPTIMIZATION (FSO) WITH OPTIMALLY PLACED RECOVERY TONES

INCORPORATION BY REFERENCE

The present patent application claims priority to the provisional patent application identified by U.S. Ser. No. 63/106,420, filed on Oct. 28, 2020, the entire content of which is hereby incorporated by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, trans-continental communication.

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal), which may be collectively integrated onto a common semiconductor substrate.

A WDM system may also include a receiver circuit, such as a receiver (Rx) PIC, having a photodiode, and an optical demultiplexer circuit (referred to as a "demultiplexer") configured to receive the combined output and demultiplex the combined output into individual optical signals.

A WDM system may also include a set of nodes (e.g., devices of the WDM system that may be utilized to route the multiple optical signals, add another optical signal to the multiple optical signals, drop an optical signal from the multiple optical signals, or the like). During transmission of an optical signal in a WDM system, a set of intermediate nodes, such as a set of reconfigurable add-drop multiplexers (ROADMs), may be utilized to route and/or amplify the optical signal.

ROADMs are characterized by the number of fiber optic cables that the ROADMs can be connected to. Each fiber optic cable that a particular ROADM can be connected to is referred to in the art as a "degree". Thus, if a particular ROADM is configured to be connected to four fiber optical cables, then such ROADM is referred to in the art as having four degrees. For each degree, the ROADM has an optical device known as a wavelength selective switch connected to the fiber optic cable. The wavelength selective switch has a plurality of input ports, and functions to combine and shape the spectrum of light received at the input ports into a single combined signal that is passed onto the fiber optic cable. Shaping the light received at the plurality of input ports includes blocking optical signals having undesired wavelengths of light received at the input ports so that the single combined signal does not include the blocked optical signals. To block the undesired optical signals, each of the input ports of the wavelength selective switch includes a separate reconfigurable filter.

ROADMs may also be provided with a splitter which splits light and directs the light to ports of the wavelength selective switches. In colorless, directionless and contentionless networks, the splitter broadcasts each wavelength of light to all of the N degrees of the node and the wavelength selective switches select, for each degree, which wavelengths are blocked and which wavelengths are let through.

In fiber optic communications, "perturbation" is a deviation in the optical signal from its normal course caused by an outside influence. Nonlinearity is a particular type of perturbation in which the behavior of the optical signal transmitted from a transmitter to a receiver deviates from its normal course and does not vary in direct proportion to the optical signal transmitted at the transmitter. Examples of nonlinearities include intra-channel nonlinearities, stimulated Brillouin scattering (SBS), stimulated Raman scattering (SRS), four wave mixing (FWM), self-phase modulation (SPM), cross-phase modulation (XPM), and intermodulation.

Generally, subsea optical communication systems communicate over long distances by operating at constant optical power. The designed power of a data channel in the subsea optical communication system is the total constant power (in dBm or milliwatts) divided by the number of data channels that can fit within the repeater bandwidth of the subsea communication line. When the subsea optical communication system is not fully populated with data channels, such as during early installations or during upgrades where fewer higher capacity channels can replace many legacy channels, the power per channel of those fewer channels will be higher than the designed optimal power. In contrast, terrestrial communication lines generally use constant gain amps, that is, as channels are added power is added such that the power is the same for each channel.

Modern optical communication systems are designed with spectral windows close to 5 THz (from about 191 THz to about 196 THz) due to the advancement of optical fiber and optical amplifier technology. This has led to the development and deployment of optical add drop multiplexing branching unit (OADM-BU) based subsea cables servicing multiple countries with a single fiber pair. Since the spectrum is split and shared along branches between different cable landing stations, in the event of a single or multiple cable cuts of a branch, the remaining un-cut branches will experience a drop in performance due to nonlinear penalties induced by the increased channel power.

When submarine optical communication systems are commissioned, they are often equipped with a fraction of the designed capacity. Submarine repeaters operate at the maximum designed output power and work on constant output power mode. Loading channels are used to fill used spectrum and ensure data-carrying channels operate with optimum power levels. Channelized amplified spontaneous emission (ASE) noise, or multiple ASE idler channels, are often used as loading channels. When new data carrying channels are added these ASE loading channels are gradually removed.

Existing solutions for recovering channel performance in the event of a cable cut in an optical network using an OADM-BU uses ASE idler channels to adjust and recover remaining channels. However, this has several limitations, such as requiring all digital line segments use the same modulation format causing some digital line segments to operate with excess margins, thereby decreasing spectral efficiency. Additionally, as ASE idler channels are replaced with data-carrying channels, adjustment of the remaining ASE idler channels will not be adequate to equalize power across multiple channels, or the band.

Thus, there is a need to reduce nonlinear penalties due to a failed branch in the remaining channels. It is to such a system and method that the present disclosure is directed.

SUMMARY OF THE DISCLOSURE

The problem of reducing nonlinear penalties due to the failed branch in the remaining channels is addressed by an apparatus or method including a continuous wave idler and an optical coupler that provide an optical signal having a power greater than optical channels carrying data, and positioned at a cross-over point between two spectral bands, with each band encompassing multiple optical channels.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
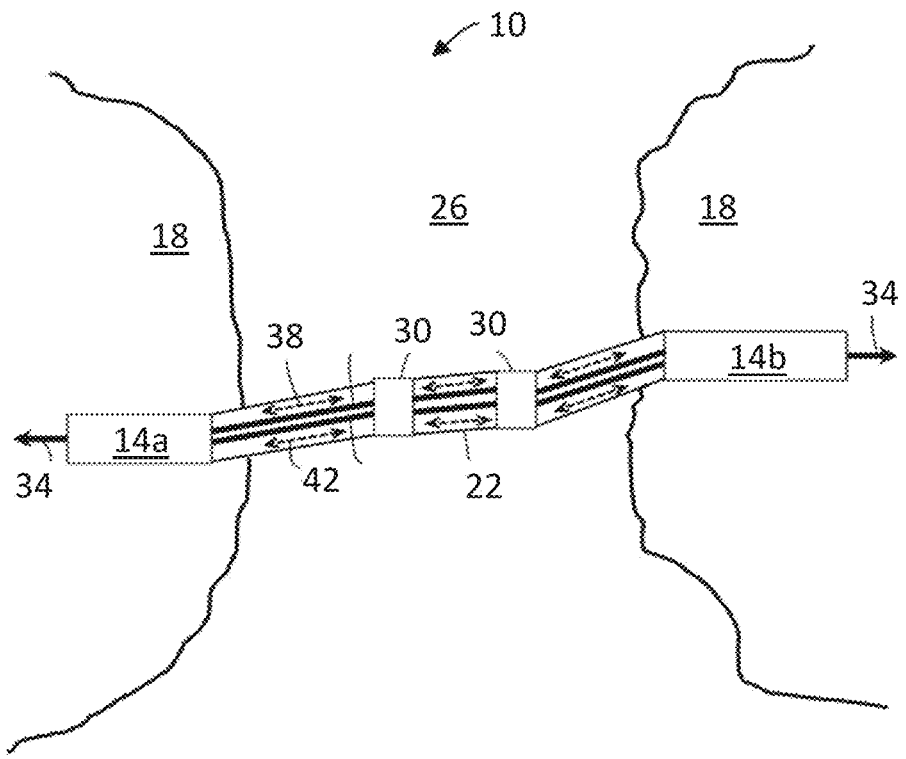
FIG. 1 illustrates an optical communication system consistent with aspects of the present disclosure.

The following detailed description refers to the accompanying drawings. The same reference numbers in different drawings may identify the same or similar elements.

The problems of nonlinear penalties discussed above are solved by an apparatus including a continuous wave idler and an optical coupler that provide an optical signal having a power greater than optical channels carrying data, and positioned at a cross-over point between two spectral bands, with each band encompassing multiple optical channels.

If used throughout the description and the drawings, the following terms have the following meanings unless otherwise stated:

Band: The complete optical spectrum carried on the optical fiber. Depending on the fiber used and the supported spectrum which can be carried over long distances with the current technology, relevant examples of the same are: C-Band/L-Band/Extended-C-Band. As used herein, the C-Band is a band of light having a wavelength between about 1528.6 nm and about 1566.9 nm. The L-Band is a band of light having a wavelength between about 1569.2 nm and about 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

LS (Light source): A card where the digital transport client is modulate/de-modulated to/from an optical channel. This is the place where the optical channel originates/terminates.

OA (Optical Amplifier) stands for a band control gain element generally EDFA or RAMAN based.

PD (Photo-Diode) stands for a device which can measure the power levels in the complete band.

SCH (Super Channel/Optical Channel) stands for a group of wavelengths sufficiently spaced so as not to cause any interference among the group of wavelengths. The group of wavelengths may be sourced from a single light source and managed as a single grouped entity for routing and signaling in an optical network. Each optical channel included in a super-channel may be associated with a particular optical wavelength (or set of optical wavelengths). The multiple optical channels may be combined to create a super-channel using wavelength division multiplexing and then routed together through the optical network. For example, the multiple optical channels may be combined using dense wavelength division multiplexing, in which channel-to-channel spacing may be less than one nanometer. In some implementations, each optical channel may be modulated to carry an optical signal.

WSS (Wavelength Selective Switch) is a component used in optical communications networks to route (switch) optical signals between optical fibers on a per-slice basis. Generally power level controls can also be done by the WSS by specifying an attenuation level on a reconfigurable pass-band filter. A wavelength Selective Switch is a programmable device having source and destination fiber ports where the source and destination fiber ports and associated attenuation can be specified for a pass-band.

Slice stands for an N GHz (N=12.5, 6.25, 3.125) spaced frequency band of the whole of the optical spectrum each such constituent band is called a slice. A slice is the spectral resolution at which the wavelength selective switch operates to build the filter response. A channel (or super-channel) pass-band is composed of a set of contiguous slices.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

An Optical Cross-Connect is a device for switching at least a portion of a spectrum of light in an optical signal received on an input optical port to any (one or more) output optical port. An optical cross-connect can be configured on ROADM network elements, with a built-in wavelength selective switch (WSS) component that is used to route an optical signal in any of the fiber degree or direction. For example, an exemplary optical cross connect can be formed within a wavelength selective switch by opening a specified channel, or specific spectrum of light on an input port of the wavelength selective switch. Configuring or pre-configuring an optical cross-connect may be accomplished by providing instructions to a device to cause the device to switch at least a portion of a spectrum of light in an optical signal received on an input port to any (one or more) output optical port.

A digital line segment (DLS) is a possible communication link between any two nodes in the optical network. For example, in an optical network with Node A, Node B, and Node C interconnected to each other, three DLS are formed: a first DLS between Node A and Node B, a second DLS between Node A and Node C, and a third DLS between Node B and Node C.

Amplified spontaneous emission (ASE) is light produced by spontaneous emission that has been optically amplified by the process of stimulated emission in a gain medium. ASE is an incoherent effect of pumping a laser gain medium to produce a transmission signal. If an amplified spontaneous emission power level is too high relative to the transmission signal power level, the transmission signal in the fiber optic cable will be unreadable due to the low signal to noise ratio.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of one or more channel may be called a media channel. Spectral loading may also be described as the addition of one or more media channel to a specific spectrum of light described by the light's wavelength to be supplied onto the optical fiber as the optical signal.

Line amplifier dynamics (i.e., EDFA, Raman) and interactions in optical fiber (Signal-Signal Raman gain, etc.) are likely to change based on spectral loading changes (such as number of optical channels in the fiber optic cable and/or the wavelength of the present optical channels, etc.) In other words, amplifier and optical fiber dynamics differ when the wavelength of the optical signals, or optical carriers, for existing optical channels change and this causes changes in the tilt.

Tilt, also called linear power tilt, is the linear change in power with wavelength over the signal spectrum. Due to Raman gain, short wavelength signals provide Raman gain for longer wavelengths. SRS Tilt strength, that is the difference in gain between the longest wavelength and the shortest wavelength of the signals, depends on the transmission signal power, spectral loading, fiber type, and fiber length.

Referring now to the drawings, and in particular to FIG. 1, an exemplary embodiment of subsea communication system 10 constructed in accordance with the present disclosure is illustrated therein. Subsea communication system 10 typically includes at least two cable landing stations 14a, 14b on land 18 and at least one optical fiber pair 22 extending underwater, such as on the ocean floor 26, between the two cable landing stations 14a, 14b. The subsea communication system 10 may also include one or more in-line node 30 between the cable landing stations 14a, 14b, which may, in part, boost signals in the optical fiber pair 22.

Optical signals are preferably grouped according to a plurality of superchannels SC1, SC2, for example, as described with respect to FIG. 3 below. Each cable landing station 14a-n preferably uses the exemplary systems and methods discussed below to transmit and receive carriers, such as superchannels, SC1, SC2, in the subsea communication system 10.

In one embodiment, the cable landing stations 14a, 14b also provide transmission between the optical fiber pair 22 and at least one terrestrial system 34.

In one embodiment, the optical fiber pair 22 is one or more slope-matched cable, however, in another embodiment, the optical fiber pair 22 is a dispersion compensated fiber having a zero-dispersion window. The optical fiber pair 22 may include a first fiber optic cable operable to carry a first optical signal in a first direction and a second fiber optic cable operable to carry a second optical signal in a second direction. In one embodiment, the optical fiber pair 22 is an optical fiber submarine cable pair.

In one embodiment, the in-line node 30 may be a repeater or an in-line amplifier. In one embodiment, the in-line node 30 is a "repeater" that receives, amplifies, and transmits the optical signals, thereby increasing a transmission range of the optical signals. The in-line node 30 as a repeater may operate at a maximum output power. Output power may be set such that, when the optical signal is fully loaded, the optical signal is operating at optimum power. Not all subsea communication systems 10 utilize in-line node(s) 30 and the present disclosure may apply to both repeater and repeaterless systems. In one embodiment, if the optical signal is not fully loaded, the remaining channels in the optical signal will operate with a higher power.

Subsea communication system 10 typically utilizes Wavelength Division Multiplexing (WDM) such as Dense Wavelength Division Multiplexing (DWDM). Dense Wavelength Division Multiplexing multiplexes multiple optical signals, such as Optical Channel signals or Super-Channel signals, onto a single optical fiber by using different laser light wavelengths.

In subsea communication system 10, one or more data channel may be transmitted using the optical signal 38 through the optical fiber pair 22. As previously described, the subsea communication system 10 is in constant power in order to transmit for long distances with low noise. To be able to operate through the subsea communication system 10 at a lower power than the constant power, one or more idler signal 42 in one or more idler channel may also be transmitted. The idler channel(s) are transmitted at different frequencies than the one or more data channel. The idler channel "soaks up" the unwanted power not used by the one or more data channel so that each data channel may operate at the correct power.

Figure 2:
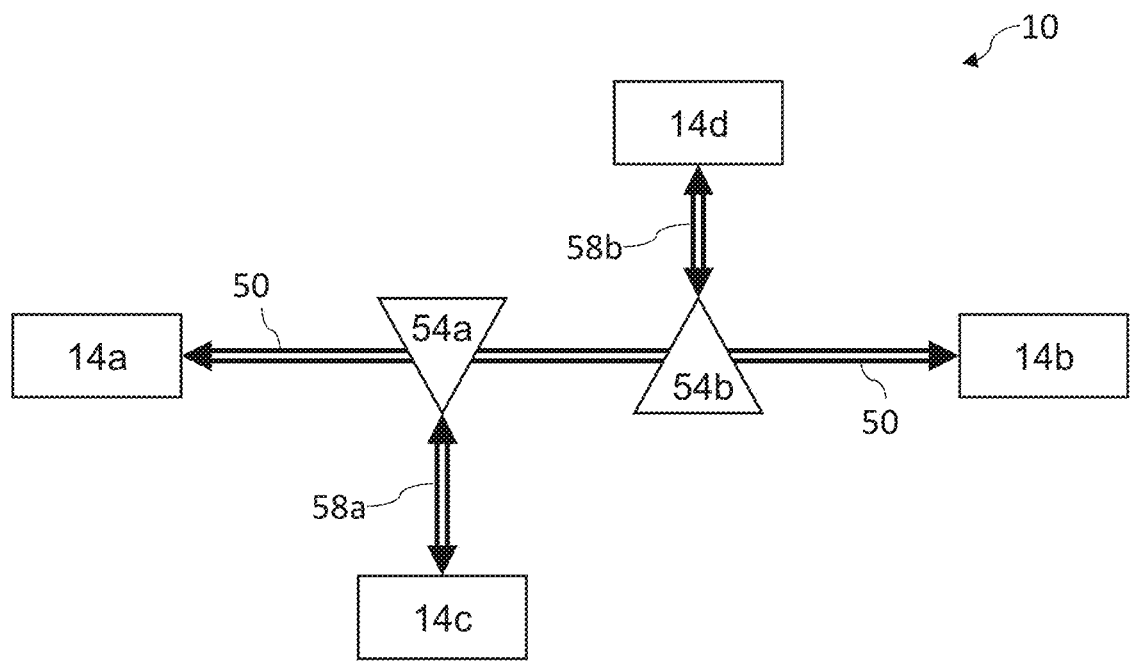
FIG. 2 illustrates an optical link consistent with aspects of the present disclosure.

Referring now to FIG. 2, shown therein is a function diagram of an exemplary embodiment of the subsea communication system 10 shown in FIG. 1 and constructed in accordance with the present disclosure. The subsea communication system 10 generally comprises the first cable landing station 14a and the second cable landing station 14b optically coupled by optical trunk 50 formed of the optical fiber pair 22. Intermediate the first cable landing station 14 and the second cable landing station 14b on the optical trunk 50 is one or more branching unit 54, illustrated as first branching unit 54a and second branching unit 54b, shown in FIG. 5 and described in more detail below. The first branching unit 54a receives optical signals from the optical trunk 50, filters out a first branching optical signal from the optical signals, and directs the first branching optical signal along a first optical branch 58a. The first branching unit 54a also receives optical signals from the first optical branch 58a, and supplies the optical signals onto the optical trunk 50. The second branching unit 54b receives optical signals from the optical trunk 50, filters out a second branching optical signal from the optical signals, and directs the second branching optical signal along a second optical branch 58b. The second branching unit 54a also receives optical signals from the second optical branch 58b and supplies the optical signals onto the optical trunk 50. In one embodiment, each of the optical trunk 50, the first optical branch 58a, and the second optical branch 58b is an optical fiber pair 22 operable to carry an optical signal. In one embodiment, the optical trunk 50 is fully loaded, that is, the optical trunk 50 is loaded with the full spectrum, while each optical branch 58 is loaded with the spectral components, such as channels or superchannels, added and dropped towards a particular cable terminal station 14c or 14d connected to the optical trunk 50 by the optical branch 58a or 58b.

In one embodiment, each branching unit 54 of the subsea communication system 10 is either a fixed optical add/drop multiplexer (FOADM) or a reconfigurable optical add drop multiplexer (ROADM). Each branching unit 54 can add/drop one or more channel or superchannel onto or from an optical branch 58a-n for communication with a cable landing station 14n not directly connected to the optical trunk 50. Each branching unit 54 may be arranged such that every cable landing station 14 is connected via a digital line segment (DLS) to another cable landing station 14 by partitioning the spectrum of the optical fiber pair 22 into one or more superchannel. For example, as shown in FIG. 2, a plurality of DLS-n may be formed such that DLS-1 is a digital line segment between the first cable landing station 14a and the second cable landing station 14b, DLS-2 is a digital line segment between the first cable landing station 14a and the third cable landing station 14c, DLS-3 is a digital line segment between the first cable landing station 14a and the fourth cable landing station 14d, DLS-4 is a digital line segment between the second cable landing station 14b and the third cable landing station 14c, DLS-5 is a digital line segment between the second cable landing station 14b and the fourth cable landing station 14d, and DLS-6 is a digital line segment between the third cable landing station 14c and the fourth cable landing station 14d. Each DLS-n may be considered a bi-directional, logical path through the subsea communication system 10 between two specific cable landing stations 14.

In one embodiment, the subsea communication system 10 employs modulation formats such as BPSK, QPSK, 8-QAM, and 16-QAM, which are highly susceptible to nonlinear distortions when channel power levels increase. In the event of a cable failure, such as a cut cable or a cable fault, part of the optical power in the spectrum will be lost, raising the power of the remaining parts of the spectrum. The increase in power could potentially cause some or all of the remaining channels to operate in degraded conditions. While the modulation formats described include BPSK, QPSK, 8-QAM, and 16-QAM, the subsea communication system 10 is not limited to these modulation formats. For example, the subsea communication system 10 may use 32-QAM, 64-QAM or a higher-level quadrature amplitude modulation format, or a different modulation format entirely. The systems and methods of the present disclosure are not dependent on the modulation format used.

Figure 3:
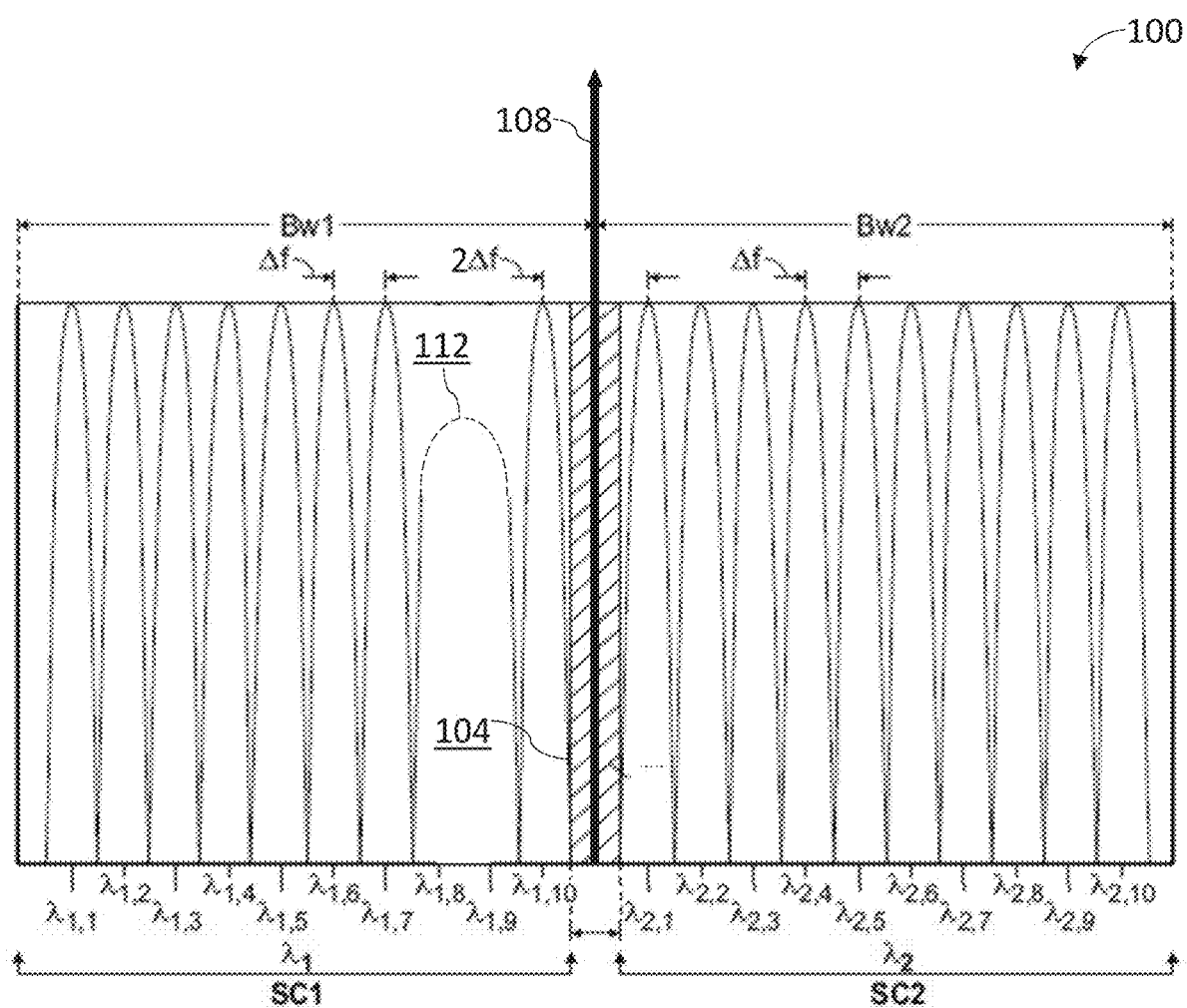
FIG. 3 illustrates a wavelength plan for two superchannels separated by a guard-band and transmitted in an optical communication system consistent with aspects of the present disclosure.

Referring now to FIG. 3, shown therein is a diagram of an exemplary embodiment of a wavelength channel plan 100 with the presence of a guard-band 104. The optical signals or carriers, e.g., one or more data channel, included in each group or band are centered around a wavelength or frequency specified by the International Telecommunications Union (ITU) standard wavelength or frequency grid. Alternatively, each of the optical carriers is provided according to a unique nonstandard grid that is optimized for a specific embodiment. For example, as shown in FIG. 3, a plurality of optical signals or carriers $\lambda 1,1$ to $\lambda 1,10$ are grouped or banded together to form a superchannel SC1, and a plurality of optical signals or carriers $\lambda 2,1$ to $\lambda 2,10$ are grouped or banded together to form a superchannel SC2. As shown, the plurality of optical (sub-wavelength) channels $\lambda 1,1$ to $\lambda 1,10$ and $\lambda 2,1$ to $\lambda 2,10$ are closely spaced so as to optimize the occupied bandwidth BW1 and BW2 of the superchannels SC1 and SC2, respectively. Each optical channel $\lambda 1,1$ to $\lambda 1,10$ and $\lambda 2,1$ to $\lambda 2,10$ of SC1 and SC2, respectively, may be considered a sub-wavelength channel banded around a center wavelength $\lambda 1$ and $\lambda 2$ identifying the superchannels SC1 and SC2, respectively. As described above, each of the superchannels SC1 and SC2 may be multiplexed or independently routed through the subsea communication system 10 shown in FIG. 1 or FIG. 2. In one embodiment, the guard-band 104 is between about 100 GHz-200 GHz wide. In another embodiment, the guard-band 104 is approximately the same width of each of the one or more channels in the superchannel SC1 and/or SC2. In one embodiment, each of superchannel SC1 and SC2 is associated with one DLS-n. Each superchannel SC1 and SC2 may be described in relation to each other, such that the superchannel SC2 may be described as the next superchannel in the spectrum in relation to the superchannel SC1 and the superchannel SC1 may be described as the previous superchannel in the spectrum in relation to the superchannel SC2.

In an exemplary embodiment, the plurality of channels $\lambda 1,1$ to $\lambda 1,10$ and $\lambda 2,1$ to $\lambda 2,10$ are periodically spaced from each other by a fixed frequency spacing according to a specific unique frequency grid. In other words, as shown in FIG. 3, a corresponding frequency spacing between the center wavelengths $\lambda 1,6$ and $\lambda 1,7$, shown as $\Delta f$, is the same for each of the other carriers within a particular superchannel SC1, SC2. Thus, each of the carriers are said to be periodically spaced from each other by $\Delta f$. Because a transmit node, such as the cable landing station 14a, can produce a plurality of superchannels $\lambda 1$ to $\lambda n$, in order to utilize common optical components for each superchannel, the channels for each superchannel utilize the same fixed frequency spacing $\Delta f$ as shown in FIG. 3. In one embodiment, where each of the channels within a particular superchannel do not utilize the same modulation format, the frequency spacing $\Delta f$ between one or more channel may be different.

Also shown in FIG. 3 is a CW channel 108, and an ASE channel 112, discussed in more detail below. In one embodiment, the CW channel 108 has a CW power that is greater than the power of any of the optical signals or carriers forming the superchannel SC1 or the superchannel SC2 and has a bandwidth that is less than the bandwidth of each of the one or more data channel. In one embodiment, the bandwidth of the CW channel 108 is between about 10 Mhz and about 25 GHz. In one embodiment, the CW channel 108 is within the guard-band 104, and spaced spectrally from an adjacent carrier within a range of 50-100 GHz. In one embodiment, the ASE channel 112 has an ASE power that is lesser than the power of any of the optical signals or carriers forming the superchannel of which it is a member, such as the superchannel SC1 in FIG. 3. The ASE channel 112 further has a bandwidth approximately equal to the bandwidth of the one or more channel forming the superchannel SC1. In one embodiment, the ASE channel 112 may be considered a sub-wavelength channel banded around a center wavelength $\lambda 1$ and $\lambda 2$ identifying the superchannels SC1 and SC2, respectively, and is periodically spaced from the plurality of optical signals or carriers carrying data by a fixed frequency spacing according to the specific unique frequency grid, that is, the ASE channel 112 may utilize the same fixed frequency spacing $\Delta f$. In one embodiment, more than one CW channel 108 may be included in the spectrum.

It is understood that the characteristics of optical components can vary with respect to temperature and other environmental conditions. Thus, throughout the disclosure where a "fixed" frequency or wavelength spacing is described, such fixed spacing is a theoretical or ideal fixed spacing that is desired, but may not be achieved exactly due to environmental conditions. Thus, any substantially similar spacing, frequency or wavelength within expected optical component variations may correspond to the ideal fixed spacing described.

Because of the non-ideal response of optical components, such as a reconfigurable filter of a wavelength selective switch, for example, filtered channels shows a roll-off effect that needs to be accounted for in a wavelength channel plan. The common way to deal with this non-ideal filtering effect is by allocating enough spectrum in between channels (or superchannels) so that the roll-off can be accommodated for. In one embodiment, the guard-band 104 is generally unoccupied spectral spacing between superchannels. Conventionally, a wavelength selective switch will pass the guard-band 104 in an open state.

Figure 3A:
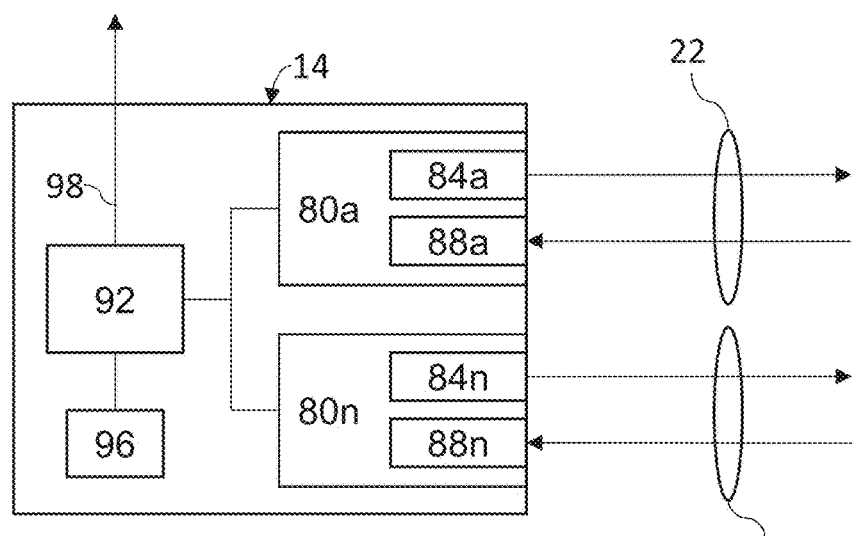
FIG. 3A Illustrates a block diagram of a cable landing station constructed in accordance with the present disclosure.

Referring now to FIG. 3A, shown therein is a block diagram of an exemplary embodiment of a cable landing station 14 constructed in accordance with the present disclosure. The cable landing station 14 generally includes a plurality of submarine line terminating equipment modules 80a-n (SLTE module 80a-n) Each SLTE module 80a-n includes at least a transmitter module 84, shown in FIG. 4 and described in more detail below, and a receiver module 88. As shown in FIG. 3A, an SLTE module 80a includes a transmitter module 84a and a receiver module 88a. Each SLTE module 80a-n may be in communication with a processor 92, which is in communication with a memory 96. The memory 96 is a non-transitory computer readable medium operable to store computer readable instructions that when executed by the processor 92 causes the processor to execute one or more operation. In one embodiment, the processor 92 may further be coupled to a communication link 98.

Figure 4:
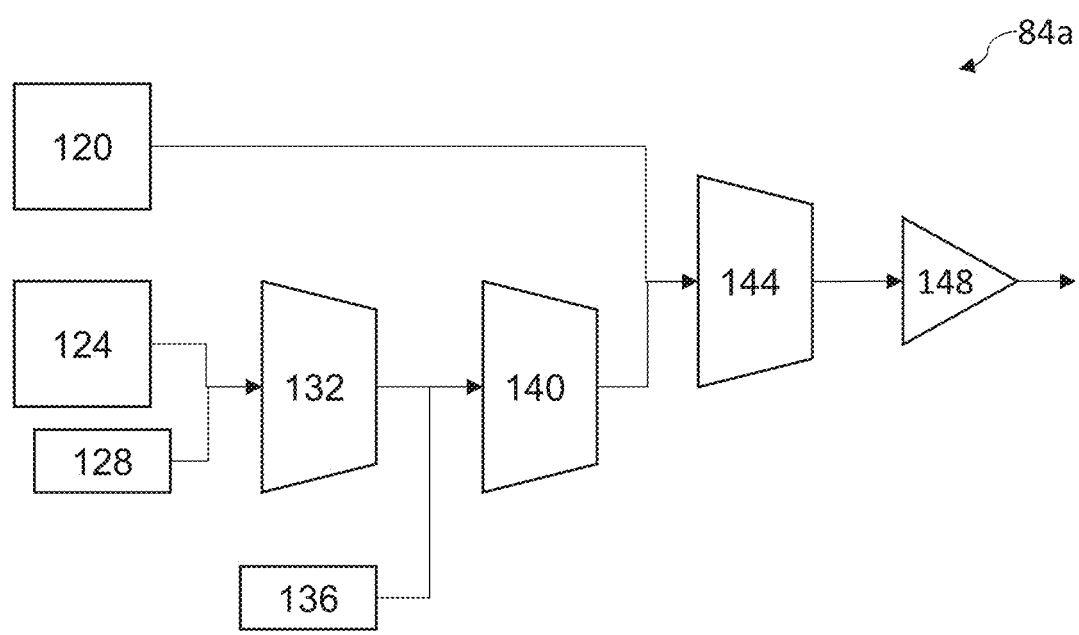
FIG. 4 illustrates a block diagram of a transmitter module constructed in accordance with the present disclosure consistent with aspects of the present disclosure.

Referring now to FIG. 4, shown therein is a block diagram of an exemplary embodiment of the transmitter module 84a of the SLTE module 80 of FIG. 3A, constructed in accordance with the present disclosure. In one embodiment, the transmitter module 84 generally includes a submarine line terminating equipment component 120, a transponder 124, an ASE idler 128, a wavelength selective switch (WSS) 132, a CW idler 136, a first coupler 140, a second coupler 144, and an amplifier 148. In one embodiment, the SLTE module 80 does not include the existing component 120.

In one embodiment, the submarine line terminating equipment component 120 includes transmission equipment, which may supply one or more channel. The submarine line terminating equipment component 120 further supplies one or more ASE idler channel.

In one embodiment, the transponder 124 is operable to receive one or more data or information stream, and, in response to a respective one of these data streams, may output one or more optical data channel, or a superchannel, to the WSS 132.

In one embodiment, the ASE idler 128 generates a broadband ASE signal having an ASE power. The ASE power may be similar to or lower than a power of the plurality of channels. The ASE signal is optically connected to the WSS 132. The WSS 132 multiplexes a plurality of channels and superchannels together. In order to keep the plurality of channels and superchannels at an optimum operational power, an ASE channel, such as the ASE channel 112 shown in FIG. 3, is shaped by the WSS 132 from the ASE signal such that the ASE channel is located at one or more optical channel $\lambda 1,1$ to $\lambda 1,10$ and $\lambda 2,1$ to $\lambda 2,10$ different from any of the one or more data carrying optical channel, or a superchannel, output by the transponder 124. In one embodiment, the WSS 132 is a multiplexer/demultiplexer that is capable of adding or dropping and adjusting one or more channel, including both data channels and ASE channels, remotely. The WSS 132 may be in communication with the processor 92 and operable to add/drop or adjust the one or more channel based on an instruction from the processor 92.

In one embodiment, the transmitter module 84 includes the CW idler 136. The CW idler 136 may be a depolarized continuous wave idler to provide a CW channel, such as the CW channel 108 shown in FIG. 3, to inject optical power into the guard-band 80 of the spectrum to replace power lost due to one or more lost data carrying channel, or one or more ASE channel. The CW idler 136 is optically coupled to supply the CW channel to the first coupler 140. In one embodiment, the CW idler 136 is an un-modulated or low modulated laser used to soak optical power but does not carry data traffic. In one embodiment, the CW idler 136 is an orthogonally polarized continuous wave laser that generates a discrete CW channel having a wavelength spectrum sized and configured tobe placed at an edge of a bandwidth adjacent to a failed superchannel. In one embodiment, the CW channel 108 may be entirely within at least one of the guard-band(s) 80. For example, referring to FIG. 3, if a cable failure causes loss of the superchannel SC1, the CW idler 136 may generate the CW channel 108 at a lower-frequency end of the bandwidth Bw2 adjacent failed superchannel SC1. In one embodiment, more than one CW channel 108 may be generated and inserted into the spectrum. In one embodiment, one or more CW channel 108 may be generated by a different CW idler 136.

In one embodiment, each CW channel can compensate for power lost due to a loss of multiple channels, such as up to 16 channels. In one embodiment, the transmitter module 84 includes more than one CW idler 136 where each CW idler 136 is optically coupled to the first coupler 140. In one embodiment, the transmitter module 84 includes up to four (4) CW idlers 136 optically coupled to the first coupler 140 for each optical fiber pair 22. In one embodiment, the CW idler 136 is activated, e.g., in response to a communication from the processor 92, in the event of a cable cut to supply optical power into the spectrum to protect the affected section of the optical fiber pair 22 and the rest of the spectrum. Each CW idler 136 may supply optical power into the spectrum at a different frequency and with a different bandwidth. In one embodiment, the first coupler 140 couples the one or more channel or superchannels from the WSS 132 with the CW channel into the spectrum. In other words, the first coupler 140 combines the one or more channel or superchannel with the one or more CW channel.

In one embodiment, the second coupler 144 combines the one or more channel from the submarine line terminating equipment component 120 with the spectrum having the one or more channel or superchannel from the WSS 132 and the CW channel.

In one embodiment, the transmitter module 84 further includes the amplifier 148 amplifying the combined one or more channel or superchannel from the submarine line terminating equipment component 120, the one or more channel or superchannel from the transponder 124, and the CW channel. In one embodiment, the amplifier 148 is an erbium doped fiber amplifier with a configurable fixed output power.

In one embodiment, the first coupler 140 and the second coupler 144 are the same coupler such that the submarine line terminating equipment component 120 is coupled with the one or more channel or superchannel from the WSS 132 and the CW channel at the first coupler 140. In another embodiment, the second coupler 144 is a 2×2 coupler, that is, the second coupler 144 combines sub-optical channels from two separate inputs into two separate aggregate outputs. The second coupler 144 may also be a 50/50 coupler or a 3 dB coupler.

Figure 4A:
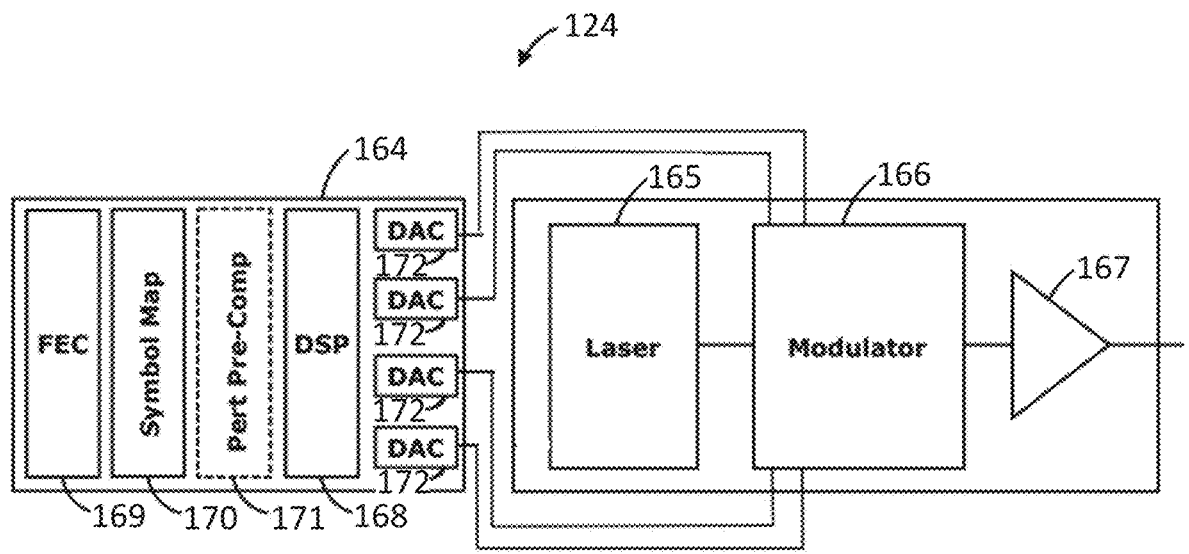
FIG. 4A is a block diagram of a coherent transmitter constructed in accordance with the present disclosure.

It will be understood that the transponder 124 may be implemented in a variety of ways. For example, shown in FIG. 4A is a block diagram of an exemplary implementation of the transponder 124. The transponder 124 may comprise one or more transmitter processor circuit 164, one or more laser 165, one or more modulator 166, one or more semiconductor optical amplifier 167, and/or other components (not shown).

The transmitter processor circuit 164 may have one or more transmitter digital signal processor (DSP) 168, Transmitter Forward Error Correction (FEC) circuitry 169, Symbol Map circuitry 170, transmitter perturbative pre-compensation circuitry 171, and digital-to-analogue converters (DAC) 172. The transmitter processor circuit 164 may be located in any one or more components of the transponder 124, or separate from the components, and/or in any location(s) among the components. The transmitter processor circuit 164 may be in the form of one or more Application Specific Integrated Circuit (ASIC), which may contain one or more module and/or custom module.

Processed electrical outputs from the transmitter processor circuit 164 may be supplied to the modulator 166 for encoding data into optical signals generated and supplied to the modulator 166 from the laser 165. The semiconductor optical amplifier 167 receives, amplifies and transmits the optical signal including encoded data in the spectrum. Processed electrical outputs from the transmitter processor circuit 164 may be supplied to other circuitry in the transmitter processor circuit 164, for example, clock and data modification circuitry. The laser 165, modulator 166, and/or semiconductor optical amplifier 167 may be coupled with a tuning element (e.g., a heater) (not shown) that can be used to tune the wavelength of an optical signal channel output by the laser 165, modulator 166, or semiconductor optical amplifier 167. In some implementations, a single laser 165 may be shared by multiple transponder 124.

Other possible components in the transponder 124 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Figure 4B:
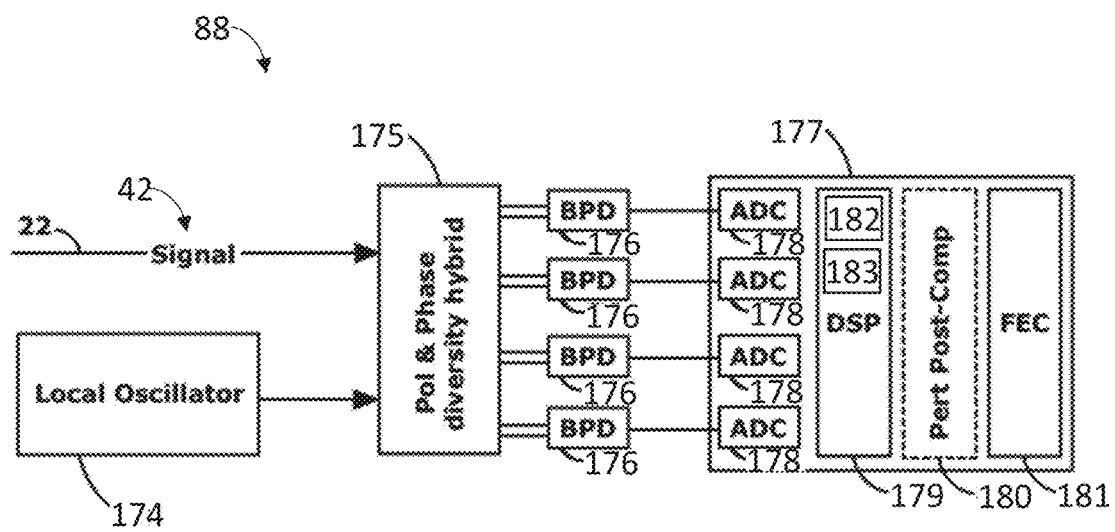
FIG. 4B is a block diagram of a coherent receiver constructed in accordance with the present disclosure.

Referring now to FIG. 4B, shown therein is a block diagram of an exemplary embodiment of the receiver module 88 consistent with the present disclosure. Receiver module 88 may comprise one or more local oscillator 174, a polarization and phase diversity hybrid circuit 175 receiving the one or more channel on the spectrum and the input from the local oscillator 174, one or more balanced photodiode 176 that produces electrical signals representative of the one or more channel on the spectrum, and one or more receiver processor circuit 177. Other possible components in the receiver module 88 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. The receiver module 88 may be implemented in other ways, as is well known in the art. Exemplary receiver module 88 are further described in U.S. patent application Ser. No. 12/052,541, titled "Coherent Optical Receiver".

The one or more receiver processor circuit 177, may comprise one or more analog-to-digital converter (ADC) 178 receiving the electrical signals from the balanced photodiodes 176, one or more receiver digital signal processor (DSP) 179, receiver perturbative post-compensation circuitry 180, and receiver forward error correction (FEC) circuitry 181. The receiver FEC circuitry 181 may apply corrections to the data, as is well known in the art. The one or more receiver processor circuit 177 and/or the one or more receiver DSP 179 may be located on one or more component of the receiver module 88 or separately from the components, and/or in any location(s) among the components. The receiver processor circuit 177 may be in the form of an Application Specific Integrated Circuit (ASIC), which may contain one or more module and/or custom module. In one embodiment, the receiver DSP 179 may include, or be in communication with, one or more processor 182 and one or more memory 183 storing processor readable instructions, such as software, or may be in communication with the processor 92 and the memory 96.

The one or more receiver DSP 179 receives and processes the electrical signals with multi-input-multiple-output (MIMO) circuitry, as described, for example, in U.S. Pat. No. 8,014,686, titled "Polarization demultiplexing optical receiver using polarization oversampling and electronic polarization tracking". Processed electrical outputs from receiver DSP 179 may be supplied to other circuitry in the receiver processor circuit 177, such as the receiver perturbative post-compensation circuitry 180 and the receiver FEC circuitry 181.

Various components of the receiver module 88 may be provided or integrated, in one example, on a common substrate. Further integration is achieved by incorporating various optical demultiplexer designs that are relatively compact and conserve space on the surface of the substrate.

In use, the one or more channel of the spectrum may be subjected to optical non-linear effects between the transponder 124 and the receiver module 88 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 171 and the receiver perturbative post-compensation circuitry 180. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler" herein incorporated by reference in its entirety, by use of analysis of one or more incoming channel at the receiver module 88.

Figure 5:
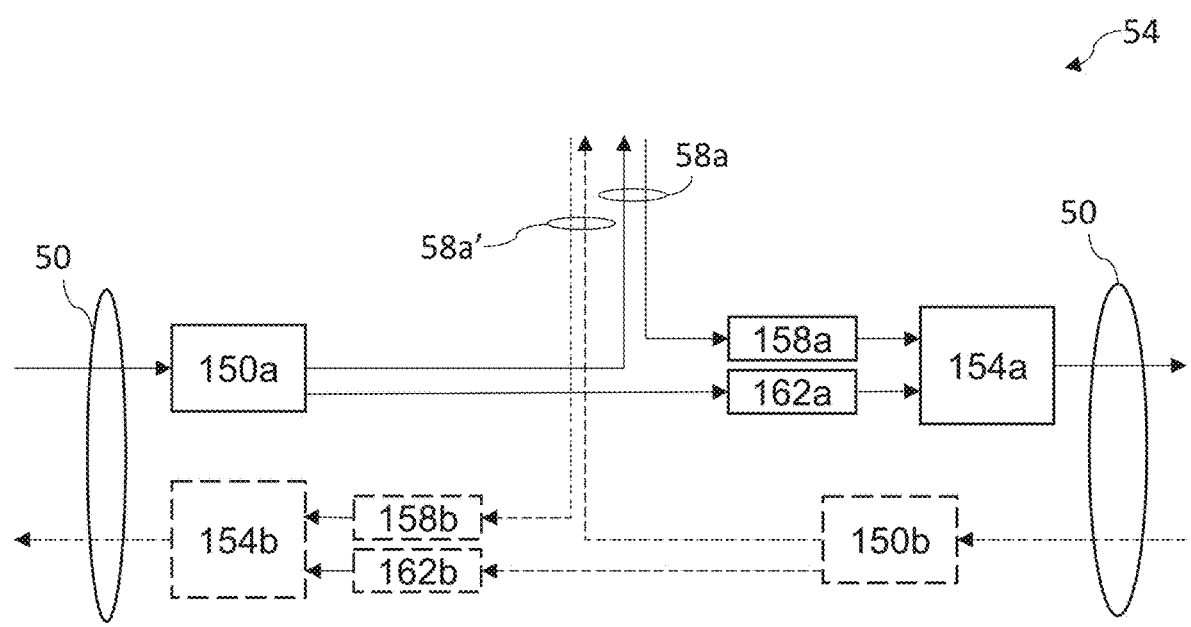
FIG. 5 illustrates a block diagram of an exemplary branching unit within the optical link of FIG. 2.

Referring now to FIG. 5, shown therein is a block diagram of an exemplary embodiment of the branching unit 54. The branching unit 54 generally includes at least two power splitters 150, illustrated as power splitter 150a and power splitter 150b, at least two branching couplers 154, illustrated as branching coupler 154a and branching coupler 154b, at least two ASE filters 158, illustrated as ASE filter 158a and ASE filter 158b, and at least two notch filters 162, illustrated as notch filter 162a and notch filter 162b. For simplicity, the branching unit 54 will be described in relation to the first direction. In one embodiment, the branching unit 54 filters one or more particular channel from the spectrum on the optical trunk 50 and directs the one or more particular channel to a cable landing station 14 on a particular optical branch 58. The notch filters 162 are operable to filter one or more channel from the spectrum into one or more drop data channel, which is filtered out of the spectrum, and one or more express data channel, that continues through the notch filter 162. A cross-over point 370 (see FIG. 8) may be used to describe a frequency, or range of frequencies, between the one or more drop data channel and the one or more express data channel. In one embodiment, the notch filters 162 and the ASE filters 158 are configurable to filter out each permutation of digital line segment that can pass through the branching unit 72. In one embodiment, one or more notch filter 162 and/or one or more ASE filter 158 is a WSS. In one embodiment, each filter 158, 162 includes a small guard-band, rendering a redundant region between filters where one or more channel and ASE channel cannot be placed without being filtered out. In one embodiment, each filter 158,162 is either a fixed or reconfigurable filter. By generating and inserting one or more CW channel 108 into the guard-band adjacent a failed superchannel, each CW channel may naturally decay in the subsea communication system 10 having one or more optical branch 58. In one embodiment, the CW channel will only decay if it is placed in a guard-band adjacent to the failed superchannel.

Generally, in operation, the power splitter 150a receives the spectrum, having one or more channel, traveling in the first direction along the optical trunk 50 and splits the spectrum into two components, both of which include all channels on the spectrum. The first component is optically coupled to the first optical branch 58a such that the first component is carried to the cable landing station 14c and the second component continues to the notch filter 162a. The cable landing station 14c receives the first component and sends one or more data-channel and, in some instances, one or more ASE channel, in a second spectrum, via the optical branch 58a, to the ASE filter 158a. The ASE filter 158a filters out the one or more ASE channel in the second spectrum such that the one or more data-channel is transmitted to the branching coupler 154a and the notch filter 162a operates to filter "drop" channels from the spectrum, that is, the notch filter 162a filters one or more channel from the spectrum that is intended for the cable landing station 14c, and transmits the remaining spectrum to the branching coupler 154a. The branching coupler 154a couples the remaining spectrum and the second spectrum such that the spectrum continues along the optical trunk 50.

In one embodiment, the full spectrum of the first component is dropped at the cable landing station 14c such that the cable landing station 14c just adds one or more data-channel originating at the cable landing station 14c along with one or more ASE channel as filler to ensure the spectrum is at an operable optical power. In other words, in one embodiment, if DLS-1 describes data-traffic from the cable landing station 14a to the cable landing station 14b, DLS-2 describes data-traffic from the cable landing station 14a to the cable landing station 14c, and DLS-3 describes data-traffic from the cable landing station 14c to the cable landing station 14b, then the branching unit 72 filters out DLS-2 data-traffic, adds DLS-3 data-traffic, and passes along DLS-1 data-traffic.

Figure 6:
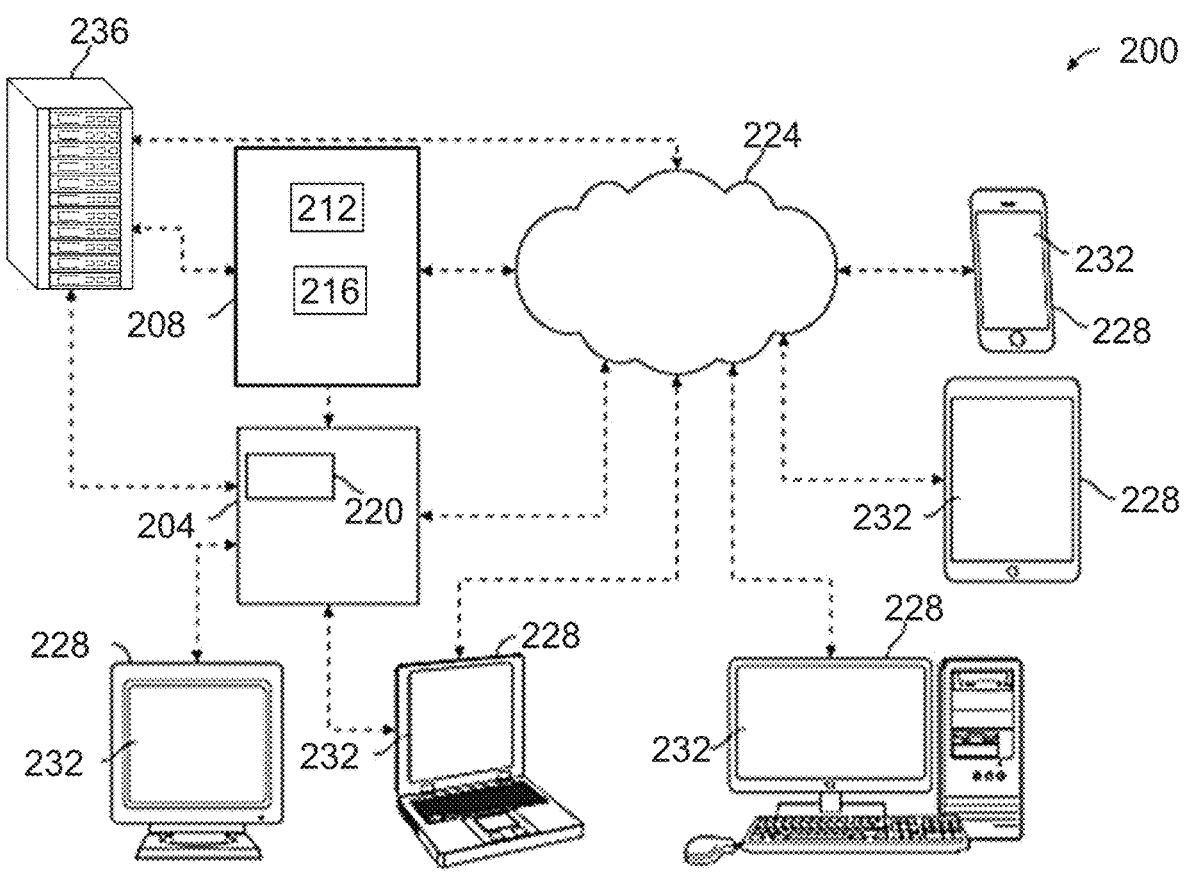
FIG. 6 is a block diagram of a computer system constructed in accordance with the present disclosure.
Figure 7:
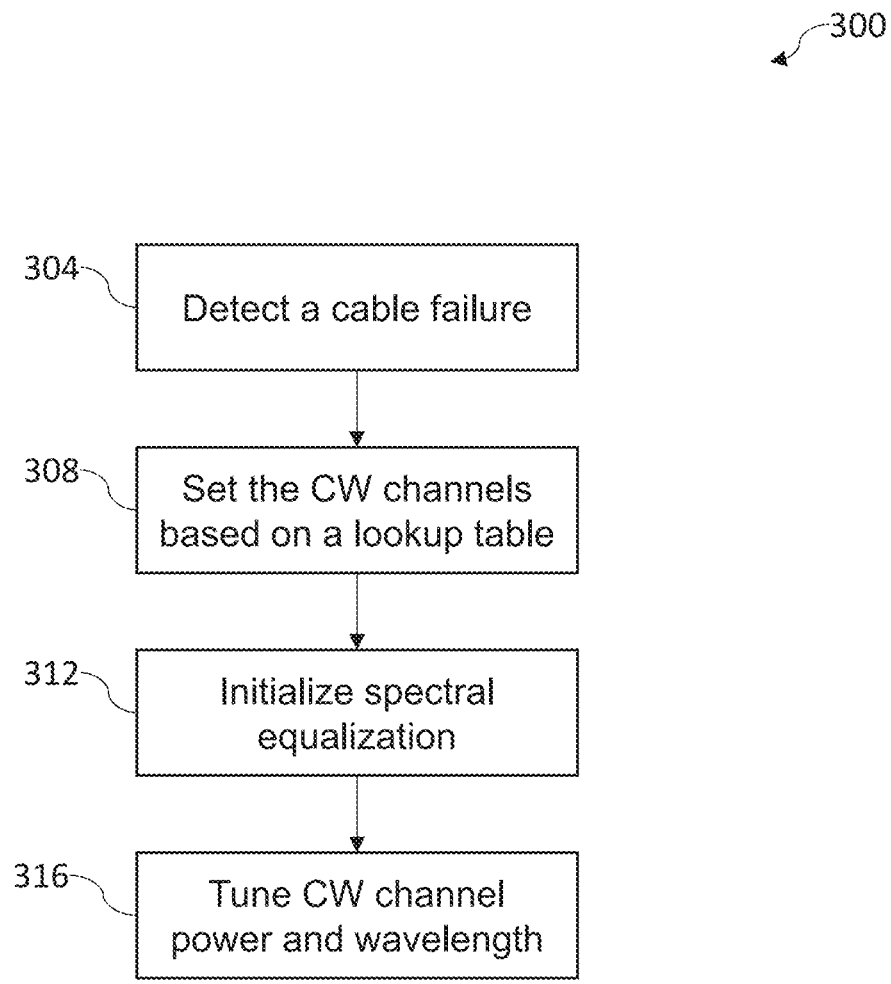
FIG. 7 is a flow chart of fast system optimization process performed by a processor in accordance with the present disclosure.

Referring now to FIG. 6, shown therein is a diagram of an exemplary embodiment of one or more computer system 200. In one embodiment, as shown in FIG. 6, a system optimization process 300, shown below and in FIG. 7, is carried out on one or more computer system 200. The computer system 200 may comprise one or more computer processor 204, and one or more non-transitory memory 208. In one embodiment, one or more initial values database 212 and one or more baseline spectral database 216 are stored in the memory 208. As shown in FIG. 6, the computer processor 204 may include (or be communicatively coupled with) one or more communication component 220. The computer system 200 may include a network 224 enabling bidirectional communication between the computer processor 204 and the non-transitory memory 208 with a plurality of user devices 228. The user devices 228 may communicate via the network 224 and/or may display information on a display 232. The computer processor 204 or multiple computer processors 204 may or may not necessarily be located in a single physical location. The user devices 228 may enable one or more user to access to the fast system optimization process 300.

In one embodiment, the network 224 is the Internet and the user devices 228 interface with the computer processor 204 via the communication component 220 using a series of web pages. It should be noted, however, that the network 224 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer processor 204 and the non-transitory memory 208 may be implemented with a server system 236 having multiple servers in a configuration suitable to provide a commercial computer-based business system such as a commercial web-site and/or data center. Additionally, it is understood that the fast system optimization process 300 may be implemented on the same or on a different server system 236.

Referring now to FIG. 7, shown therein is a process flow diagram of an exemplary embodiment of the fast system optimization process 300 generally comprising the steps of: detecting a cable failure (step 304); setting one or more CW channel (step 308); initialize spectral equalization (step 312); and tune one or more CW channel power and wavelength (step 316).

In one embodiment, detecting a cable failure (step 304) includes detecting a cut in a fiber optic cable or detecting a cable fault. Detecting a cut in a fiber optic cable may be performed by the processor 92 or 204 monitoring error signals, such as an optical loss of signal, or a loss of frame. In the event of a cable failure, the processor 204 may launch an Intelligent Power Management Software. The Intelligent Power Management Software may be accessed by a user via the user device 228, discussed in more detail above. The Intelligent Power Management Software may display one or more chart of a receive spectrum and Q for every cable landing station 14 in a chosen direction, such as the first direction or the second direction. The Intelligent Power Management Software may also load a baseline measurement for the receive spectrum. In one embodiment, the Intelligent Power Management Software is executing on the computer system 200 and causes the processor 204 to communicate with the processor 92 of each cable landing station 14 such that the processor 204 can gather CLS status information from each cable landing station 14. The CLS status information may include an optical power across the spectrum at the cable landing station 14 with a granularity of about 6.25 GHz. In other embodiments, the granularity may be more than or less than 6.25 GHz. The processor 204, in communication with the processor 92, can also control, monitor, and adjust the cable landing station 14 and the components of the cable landing station 14, such as the WSS 132, the ASE idler 128, and the CW idler 136, for example. In one embodiment, detecting a cable failure (step 304) includes identifying one or more failed superchannel.

In one embodiment, setting one or more CW channel (step 308) includes the processor 204 causing the processor 92 to set one or more CW channel to an initial wavelength and power for each location on each optical fiber pair 22. One or more CW channel is placed at an edge of a particular superchannel pass-band adjacent to an affected one or more superchannel with a combined CW power approximately equivalent to lost spectral power due to the loss of one or more channel within the spectrum due to the cable failure. In one embodiment, setting one or more CW channel (step 308) can be initialized by the user via the user device 228 whereas in another embodiment, setting one or more CW channel (step 308) is performed by the processor 204 without any manual assistance by the user, as described in more detail above. In one embodiment, the initial wavelength and initial power for each location on each optical fiber pair 22 is stored in an initial values database 212, which may be stored in the memory 208. In one embodiment, the user is one or more staff of a network operating center.

In one embodiment, setting one or more CW channel (step 308) includes the processor 204 causing the processor 92 to set a CW channel to an initial wavelength within a cross over point 370 (see FIG. 8) adjacent to a failed superchannel. In one embodiment, setting one or more CW channel (step 308) includes the processor 204 causing the processor 92 to set a first CW channel to an initial wavelength approximately 50-100 GHz greater than the failed superchannel's highest frequency and a second CW channel to an initial wavelength approximately 50-100 GHz lesser than the failed superchannel lowest frequency. In one embodiment, setting one or more CW channel (step 308) includes the processor 204 causing the processor 92 to set a first CW channel to an initial wavelength at a lower-end of the bandwidth of a next non-failed superchannel in the spectrum and set a second CW channel to an initial wavelength at a higher-end of the bandwidth of a previous non-failed superchannel in the spectrum.

In one embodiment, initializing spectral equalization (step 312) includes initializing spectral equalization at a downstream node of the optical trunk 50, e.g., the cable landing station 14b. During normal operations, the processor 204 may receive from the processor 92 and may record one or more receive spectrum status at each site on every optical fiber pair 22 and store the plurality of receive spectrum statuses as a baseline spectrum status in a baseline spectral database 216. In one embodiment, initializing spectral equalization (step 312) includes comparing, by the processor, the receive spectrum status with the baseline spectrum status in the baseline spectral database. In one embodiment, initializing spectral equalization (step 312) is initialized by the user and executed by the processor, whereas in another embodiment, initializing spectral equalization (step 312) is initialized by and executed by the processor.

In one embodiment, initializing spectral equalization (step 312) further includes displaying the receive spectrum for every cable landing station 14 of a selected direction. Displaying the receive spectrum may include displaying, by a processor, the receive spectrum for every cable landing station 14 of a selected direction, on the display 232 of the one or more user device 228. In one embodiment, displaying the receive spectrum is triggered by a request from the user via the user device 228.

In one embodiment, initializing spectral equalization (step 312) further includes adjusting, by the user or the processor 204, the power of the one or more CW channel and adjusting, by the user or the processor 204, the wavelength of the one or more CW channel to equalize the spectrum. In one embodiment, the user or processor 204 may further adjust, increase, decrease, or otherwise modify one or more ASE channel supplied to the spectrum. In one embodiment, adjusting, by the user or the processor 204, the power of the one or more CW channel and adjusting, by the user or the processor 204, the wavelength of the one or more CW channel to equalize the spectrum, may be performed first for the longest DLS, that is, the DLS corresponding the cable landing station 14 in either direction of the optical trunk 50, i.e., in subsea communication system 10, the DLS corresponding to the optical trunk 50 between the cable landing station 14a and the cable landing station 14b. In order to adjust, increase, decrease, or otherwise modify the one or more ASE channel, the user, through interaction with the user device 228, causes the processor 204 to issue one or more command to the processor 92 of each cable landing station 14 which, in turn, issues one or more command to the ASE idler 128.

In one embodiment, initializing spectral equalization (step 312) further includes adjusting, by the user or the processor 204, the power of the one or more data channel within the spectrum.

In one embodiment, tuning the one or more CW channel power and wavelength (step 316) includes adjusting, by the processor 204, the power and the wavelength of the one or more CW channel beginning with the DLS having the lowest Q margin, where the Q margin is the difference between a baseline transmission quality, in dB, and a current transmission quality, in dB, based on the receive spectrum status. In one embodiment, the lowest Q margin is determined by determining a Q margin for each of the one or more channel by calculating a Q performance less an FEC limit based on a modulation format of a particular channel, and selecting the particular channel having the lowest Q margin. In one embodiment, the lowest Q margin is about 0.5 dB. In one embodiment, tuning the one or more CW channel power and wavelength (step 316) further includes adjusting one or more ASE power by sending a command, by the processor 204, to the processor 92, which in turn sends a command to the WSS 132, or to the ASE idler 128, to cause the ASE idler 128 to increase the ASE power.

Figure 8:
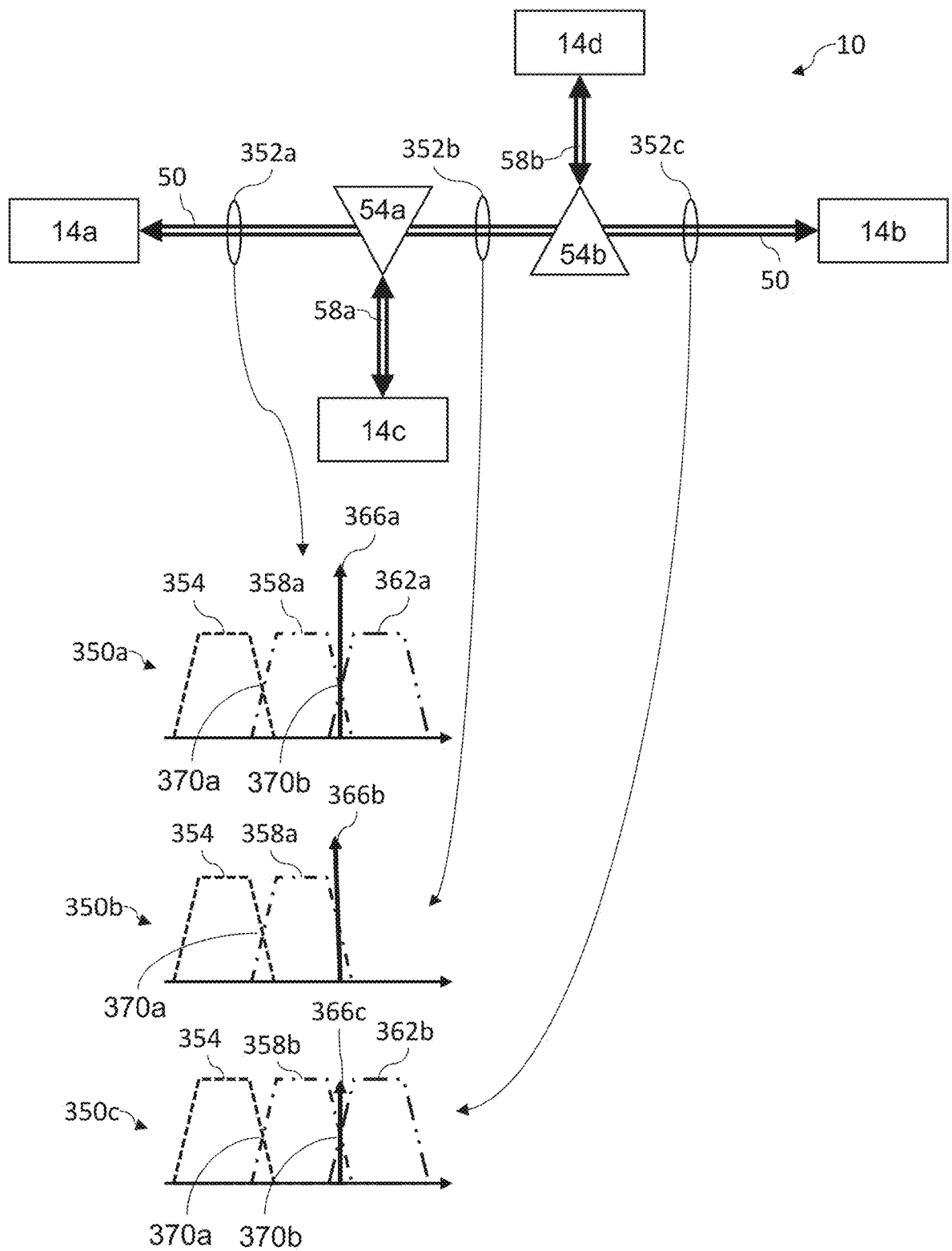
FIG. 8 is a block diagram of an exemplary embodiment of the subsea communication system of FIG. 2 having a plurality of band pass profiles illustrated for various locations within the subsea communication system.

Referring now to FIG. 8, shown therein is a block diagram of an exemplary embodiment of the subsea communication system 10 of FIG. 2 and a plurality of band pass profiles 350 at various locations 352 within the subsea communication system 10 when a cable failure has occurred in the optical branch 58a. When describing the band pass profiles 350 of the subsea communication system 10, for simplicity, only one direction is described from cable landing station 14a to cable landing station 14b, however, the subsea communication system 10 is a bidirectional optical network. Additionally, it should be understood that a more complex subsea communication system 10 having additional band pass profiles 350, additional cable landing stations 14, and additional branching units 54 than described below may also be constructed in accordance with the present disclosure. Shown in FIG. 8 is a first set of band pass profiles 350a indicative of the spectrum on the optical trunk 50 between the cable landing station 14a and the branching unit 54a shown at location 352a, a second set of band pass profiles 350b indicative of the spectrum on the optical trunk 50 between the branching unit 54a and the branching unit 54b shown at location 352b, and a third set of band pass profiles 350c indicative of the spectrum on the optical trunk 50 between the branching unit 54b and the cable landing station 14b shown at location 352c. Each set of band pass profiles 350a-c depicts a first band 354 being routed to the cable landing station 14b, a second band 358 being routed to the cable landing station 14d, a third band 362 routed to the cable landing station 14c, and a CW channel 366. Also shown in FIG. 8 are cross over points 370a and 370b. The cross over point 370a is an intersection of an edge of the first band 354 and an edge of the second band 358a or 358b. The cross over point 370b is an intersection of the second band 358a or 358b and the third band 362a or 362b. In some embodiments, the set of band pass profiles 350a, 350b, and 350c sets the filter shapes required to either block or allow particular slices of wavelengths within the bands 354, 358a, 362a, 358a and 362b. Because reconfigurable band pass filters, such as the notch filter 162a, cannot transition ideally from a response of 0 dB attenuation for example to entire attenuation, the edges of the bands 354, 358a, 362a, 358b, and 362b taper towards entire attenuation. This taper may be referred to in the art as "roll-off". And, the intersection between the edges of two adjacent bands, such as the bands 354 and 358a is referred to as a cross-over point.

For example, in one embodiment, the subsea communication system 10, implementing the fast system optimization process 300, may first detect, at the cable landing station 14a, a cable failure of the optical branch 58a. In response to detecting the cable failure, the cable landing station 14a may insert a CW channel, i.e., the CW channel 366, adjacent to any band of the spectrum intended to travel along the optical branch 58a, i.e., the third band 362 being routed to the cable landing station 14c, as indicated in the first band pass profile 350a of the spectrum. Thus, the first band pass profile 350a at the location 352a has a first band 354, a second band 358a, a third band 362a, and a CW channel 366a, wherein each of the first band 354, the second band 358a, and the third band 362a have a substantially similar band gain and the CW channel 366a has a first CW gain greater than each band gain. The second band pass profile 350b at location 352b depicts the first band 354, the second band 358a, and a CW channel 366b having a second CW gain, however, there is no third band 362 present in the second band pass profile 350b of the spectrum as the third band 362, intended for the cable landing station 14c, is dropped at the branching unit 54a by the notch filter 162a and, as the optical branch 58a has failed, no third band 362 is received by the branching coupler 154a in the branching unit 54a. By inserting the CW channel 366 at the cable landing station 14a, power is balanced across the spectrum and noise is reduced as shown by the second band pass profile 350b. As the spectrum passes through the branching unit 54a, the notch filter 162a attenuates the CW channel 366a, such that a portion of the CW channel 366a present at the location 352b (shown as CW channel 366b) is lesser than the CW channel 366a. At the location 352c, the third band pass profile 350c depicts the first band 354 still having a band gain similar to the first band 354 at the second location 352b and at the first location 352a, however, the third band pass profile 350c further includes a second band 358b and a third band 362b that has been restored, such as from the cable landing station 14d.

Specifically, the branching unit 54b routes the second band 358a to the cable landing station 14d, and receives a second band 358b from the cable landing station 14d. Further, the notch filter 162a of the branching unit 54b passes only the first band 354 and a portion of the CW channel 366b to the location 352c. The portion of the CW channel 366b at the location 352c is denoted with the reference numeral 366c. The CW Channel 366c has less power than the CW channel 366b. The cable landing station 14d transmits the restored third band 362b and the second band 358b to the branching unit 54b via the optical branch 58b where the restored third band 362b, the second band 358b, and the first band 354 are combined by the branching coupler 154a of the branching unit 54b. In one embodiment, the third CW gain of the CW channel 366c at location 352c has decayed, or otherwise been reduced, once the third band 362 has been restored as the third band 362b, such that the CW gain is substantially similar to the band gain for each of the first gain 354, the second gain 358b, and/or the third gain 362b. In other embodiments, the subsea communication system 10 includes more than two branching units 54, more than four cable landing stations 14, and/or more than three bands 354, 358, 362 within the spectrum, however, the aforementioned example is equally applicable to such subsea communication systems 10.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:
1. An apparatus, comprising:
an optical transmitter operable to supply a plurality of first optical signals, each of the plurality of first optical signals being spaced apart from one another spectrally, each of the plurality of first optical signals having a corresponding one of a plurality of first wavelengths;
a second optical transmitter configured to supply a plurality of second optical signals, each of the plurality of second optical signals being spaced apart from one another spectrally, each of the plurality of second optical signals having a corresponding one of a plurality of second wavelengths wherein a maximum one of the plurality of first wavelengths and a minimum one of the plurality of second wavelengths are spaced apart spectrally from one another encompassing a sub-band of spectrum encompassing a third wavelength;
an ASE idler operable to supply a third optical signal, the third optical signal having a first power and corresponding to a plurality of fourth wavelengths;
a wavelength selective switch having a first input port receiving the plurality of first optical signals, a second input port receiving the plurality of second optical signals, a third input port receiving the third optical signal, a first reconfigurable filter associated with the first input port and operable to pass the first optical signals and block other optical signals, a second reconfigurable filter associated with the second input port and operable to pass the second optical signals and block other optical signals, a third reconfigurable filter associated with the third input port and operable to pass selected wavelengths of the third optical signals and block unselected wavelengths of the third optical signals, and an output port, the wavelength selective switch operable to combine the plurality of first optical signals, the plurality of second optical signals, and the selected wavelengths of the third optical signals into a fourth optical signal, and wherein the first reconfigurable filter, the second reconfigurable filter, and the third reconfigurable filter are operable to block the sub-band of the spectrum encompassing the third wavelength,
a CW idler operable to supply a fifth optical signal, the fifth optical signal having a second power greater than the first power and a wavelength corresponding to the third wavelength, and a power coupler having a first input port operable to receive the fifth optical signal, a second input port operable to receive the fourth optical signal, the power coupler operable to couple the fifth optical signal with the fourth optical signal.

2. The apparatus of claim 1, wherein the first optical signals are spaced apart spectrally by a first spacing, and the sub-band of the spectrum encompassing the third wavelength is spaced apart spectrally by a second spacing, and wherein the second spacing is greater than the first spacing.

3. The apparatus of claim 1, wherein the sub-band of the spectrum encompassing the third wavelength is devoid of the selected wavelengths of the third optical signal.

4. The apparatus of claim 3, wherein the sub-band of the spectrum encompassing the third wavelength is devoid of the first optical signals and the second optical signals.

5. The apparatus of claim 1, wherein the first optical signals have a third power and the second optical signals have a fourth power, and wherein the second power of the fifth optical signal is greater than the third power and the fourth power.

* * * * *